United States Patent [19]

Kitada

[11] Patent Number: 4,704,538

[45] Date of Patent: Nov. 3, 1987

[54] RADIOGRAPHIC INTENSIFYING SCREEN

[75] Inventor: Akira Kitada, Kaisei, Japan

[73] Assignee: Fuji Photo Film Co., Ltd., Japan

[21] Appl. No.: 857,400

[22] Filed: Apr. 21, 1986

Related U.S. Application Data

[63] Continuation of Ser. No. 531,286, Sep. 12, 1983, abandoned.

[30] Foreign Application Priority Data

Sep. 13, 1982 [JP] Japan ................................ 57-158047

[51] Int. Cl.⁴ ................................................ G01J 1/58

[52] U.S. Cl. ................................ 250/486.1; 250/483.1

[58] Field of Search .................. 250/486.1, 483.1, 487, 250/488.1, 484.1

[56] References Cited

U.S. PATENT DOCUMENTS

| | | | |
|---|---|---|---|
| 3,936,644 | 2/1976 | Rabatin | 250/486.1 |
| 4,039,840 | 8/1977 | Shimiya et al. | 250/486.1 |
| 4,362,944 | 12/1982 | Suzuki et al. | 250/486.1 |
| 4,486,486 | 12/1984 | Maeoka et al. | 250/486.1 |

FOREIGN PATENT DOCUMENTS

| | | | |
|---|---|---|---|
| 0097365 | 8/1978 | Japan | 250/486.1 |

*Primary Examiner*—Carolyn E. Fields
*Assistant Examiner*—Richard Hanig
*Attorney, Agent, or Firm*—Gerald J. Ferguson, Jr.; Michael P. Hoffman; Michael J. Foycik

[57] ABSTRACT

A radiographic intensifying screen comprising a support, phosphor layers provided thereon which comprise a binder and phosphor particles dispersed therein, and a protective film provided on said phosphor layers, in which said phosphor layers comprise: (i) the first phosphor layer provided on said support containing at least one terbium activated rare earth oxysulfide phosphor; and (ii) the second phosphor layer provided on the first phosphor layer containing at least one divalent europium activated barium fluorohalide phosphor.

4 Claims, 1 Drawing Figure

RADIOGRAPHIC INTENSIFYING SCREEN

This application is a continuation of Ser. No. 531,286, filed 9/12/83, now abandoned.

BACKGROUND OF THE INVENTION

1. Field of the Invention

The present invention relates to a radiographic intensifying screen and, more particularly, to a radiographic intensifying screen comprising a support, phosphor layers provided thereon which comprise a binder and phosphor particles dispersed therein, and a protective film provided on the phosphor layers.

2. Description of the Prior Art

In a variety of radiography such as medical radiography for diagnosis and industrial radiography for nondistructive inspection, a radiographic intensifying screen is generally employed in close contact with one or both surfaces of a radiographic film such as an X-ray film for enhancing the radiographic speed of the system. The radiographic intensifying screen consists essentially of a support and a phosphor layer provided thereon. Further, a transparent film is generally provided on the free surface of the phosphor layer (a surface not facing the support) to keep the phosphor layer from chemical deterioration and physical shocks.

The phosphor layer comprises a binder and phosphor particles dispersed therein. When excited with a radiation such as X-rays transmitted through an object, the phosphor particles emit light of high luminance in proportion to the dose of the radiation. Accordingly, the radiographic film placed in close contact with the phosphor layer can be exposed sufficiently to form a radiation image of the object, even if the radiation is applied to the object at a ralatively small dose.

The radiographic intensifying screen having a protective film has adventages such that the phosphor layer is hardly scratched when the intensifying screen is in contact with a radiographic film or other devices and materials. For this reason, a radiographic intensifying screen employed in practice is generally provided with a protective film. However, the radiographic intensifying screen having a protective film has a drawback in that static electricity is likely produced between the protective film and a radiographic film, when the intensifying screen is set in close contact with the film. On the radiographic film sensitized by the radiographic intensifing screen having such static electricity, a static mark is apt to appear thereon. The static mark is produced in the form of an over-exposed portion on the radiographic film in contact with the intensifying screen, corresponding to the portion in which discharge of the static electricity takes place. The static mark appearing on the radiographic film is disadvantageous particularly in the medical radiography for diagnosis, because the static mark causes problems in the analysis of the resulting photographic image.

Terbium activated rare earth oxysulfide phosphors such as a terbium activated gadolinium oxysulfide phosphor ($Gd_2O_2S$:Tb) and a terbium activated gadolinium yttrium oxysulfide phosphor ($(Gd,Y)_2O_2S$:Tb) emit light of high luminance when excited with a radiation such as X-rays, so that these phosphors have been heretofore employed as phosphors for a radiographic intensifying screen. The static mark is often observed on a radiographic film in the case of using radiographic intensifying screens employing these phosphors. The static mark is frequently observed on a radiographic film particularly when it is used in contact with the radiographic intensifying screen having a protective film made of polyethylene terephthalate (which film is widely employed as a protective film of the intensifying screen because it has various excellent characteristics such as high mechanical strength).

For preventing production of the static mark on a radiographic film, various measures such as coating an antistatic agent over the surface of the radiographic intensifying screen or incorporating an antistatic agent into the protective film have been used. However, high and lasting preventive effect on static mark is hardly obtained by these known measures. Accordingly, further improvement of the antistatic effect is desired particularly in the radiographic intensifying screen employing the above-mentioned terbium activated rare earth oxysulfide phosphor.

As described hereinbefore, a phosphor contained in the phosphor layer of the radiographic intensifying screen emits light (spontaneous emission) upon exposure to a radiation such as X-rays, and a radiographic film in close contact with the intensifying screen is exposed to the spontaneous emission. However, light continuously released from the phosphor after the exposure to the radiation is terminated, that is an afterglow, gives a photographic fog to an image formed on the radiographic film, extremely lowering the image quality (sharpness and graininess, etc.). Especially, the above-mentioned terbium activated rare earth oxysulfide phosphor shows relatively high afterglow characteristics, and when using a radiographic intensifying screen employing the phosphor, the photographic fog caused by the afterglow is apt to appear on the resulting image. Accordingly, it is also desired to improve the afterglow characteristics of the radiographic intensifying screen employing the above-mentioned phosphor.

Further, it is desired for a radiographic intensifying screen to exhibit a high radiographic speed and to provide an image of high quality. The same is true of the radiographic intensifying screen employing the above-mentioned terbium activated rare earth oxysulfide phosphor.

SUMMARY OF THE INVENTION

An object of the present invention is to provide a radiographic intensifying screen employing a terbium activated rare earth oxysulfide phosphor improved in the antistatic characteristics.

Another object of the present invention is to provide a radiographic intensifying screen employing a terbium activated rare earth oxysulfide phosphor improved in the afterglow characteristics as well as the antistatic characteristics.

A further object of the present invention is to provide a radiographic intensifying screen employing a terbium activated rare earth oxysulfide phosphor improved in the image quality, particularly in the graininess.

These objects are accomplished by a radiographic intensifying screen of the present invention having phosphor layers, in which a phosphor layer containing a divalent europium activated barium fluorohalide phosphor is provided on the phosphor layer containing a terbium activated rare earth oxysulfide phosphor. Accordingly, the radiographic intensifying screen of the present invention comprises a support, phosphor layers provided thereon which comprise a binder and phosphor particles dispersed therein, and a protective film provided on said phosphor layers, in which said phosphor layers comprise:

(i) the first phosphor layer provided on said support containing at least one terbium activated rare earth oxysulfide phosphor; and (ii) the second phosphor layer provided on the first phosphor layer containing at least one divalent europium activated barium fluorohalide phosphor.

FIG. 1 is a schematically illustrated section of a radiographic intensifying screen of the invention comprising a support 11, a first phosphor layer 12, a second phosphor layer 13 and a protective layer 14.

DETAILED DESCRIPTION OF THE INVENTION

Figure 1:
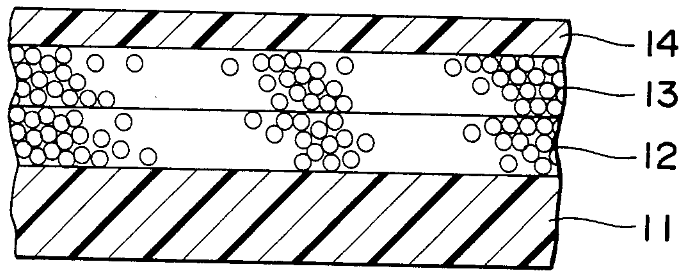

In this specification, the terbium activated rare earth oxysulfide phosphor means a phosphor having the formula (I):

$$Ln_2O_2S:Tb \qquad (I)$$

in which Ln is at least one rare earth element selected from the group consisting of Y, La, Gd and Lu. The terbium activated rare earth oxysulfide phosphor may be coactivated with Ce, Tm, Er, Pr and the like. As for the terbium activated rare earth oxysulfide phosphors, more preferred is a phosphor having the above-mentioned formula (I) in which Ln is at least one rare earth element selected from the group consisting of Y, La and Gd.

The divalent europium activated barium fluorohalide phosphor means:

(1) a phosphor having the formula (II):

$$(Ba_{1-x},M^{II}_x)FX:Eu^{2+} \qquad (II)$$

in which $M^{II}$ is at least one divalent metal selected from the group consisting of Sr, Ca and Mg; X is at least one halogen selected from the group consisting of Br, Cl and I; and x is a number satisfying the condition of $0 \leq x < 0.5$; or (2) a phosphor defined in above-mentioned formula (II), to which is added a small amount of additives such as metal halide, metal oxide and the like.

Examples of the above-mentioned phosphor (2) include:

a phosphor using as the additive KX' (in which X' is at least one halogen selected from the group consisting of Cl and Br), as disclosed in Japanese Patent Provisional Publication No. 54(1979)-42382;

a phosphor using as the additives the above-mentioned KX' and $MeSO_4$ (in which Me is at least one divalent metal selected from the group consisting of Ba, Sr and Ca), as disclosed in Japanese Patent Provisional Publication No. 53(1978)-97986;

a phosphor using as the additive at least one metal fluoride selected from the group consisting of $Me^{I}F$ (in which $Me^{I}$ is at least one monovalent metal selected from the group consisting of Li and Na), $Me^{II}F_2$ (in which $Me^{II}$ is at least one divalent metal selected from the group consisting of Be, Ca and Sr), and $Me^{III}F_3$ (in which $Me^{III}$ is at least one trivalent metal selected from the group consisting of Al, Ga, Y and La), as disclosed in Japanese Patent Provisional Publication No. 56(1981)-2385;

a phosphor using as the additives $MgF^2$ and at least one metal fluoride selected from the above-mentioned group consisting of $Me^{I}F$, $Me^{II}F_2$ and $Me^{III}F_3$, as disclosed in Japanese Patent Provisional Publication No. 56(1981)-2386;

a phosphor using as the additive at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, as disclosed in Japanese Patent Provisional Publication No. 55(1980)-160078;

a phosphor using as the additive at least one metal halide selected from the group consisting of LiX'', (in which X'' is at least one halogen selected from the group consisting of Cl, Br and I), $BeX'''_2$ (in which X''' is at least one halogen selected from the group consisting of Cl, Br and I), and $M^{III}X''''_3$ (in which $M^{III}$ is at least one trivalent metal selected from the group consisting of Al and Ga, and X'''' is at least one halogen selected from the group consisting of Cl, Br and I), as disclosed in Japanese Patent Provisional Publication No. 56(1981)-74175; and a phosphor using as the additive NaX'' (in which X'' has the same meaning as defined above), as disclosed in Japanese Patent Application No. 56(1981)-212270.

The divalent europium activated barium fluorohalide phosphor emits near ultraviolet to blue light of high luminance showing its peak at the wavelength of approximately 390 nm, upon excitation with a radiation such as X-rays, and the phosphor itself is of great value for a radiographic intensifying screen. The divalent europium activated barium fluorohalide phosphor may be coactivated with Sm and the like. As for the divalent europium activated barium fluorohalide phosphor, more preferred is a phosphor in which the divalent metal serving as a host component of fluorohalide consists of Ba alone, for example, a phosphor having the above-mentioned formula (II) in which x is a number satisfying the condition of x=0.

The radiographic intensifying screen of the present invention comprises phosphor layers, in which one phosphor layer containing a terbium activated rare earth oxysulfide phosphor is provided on the support (lower side) to form the first phosphor layer, and another phosphor layer containing a hygroscopic divalent europium activated barium fluorohalide phosphor is provided on the first phosphor layer to form the second phosphor layer. According to the radiographic intensifying screen of the present invention having the above-mentioned phosphor layers, the surface of a protective film thereof positioned in direct contact with a radiographic film is reduced in tendency for accumulation of electron charge, whereby appearance of the static mark on the radiographic film can be effectively prevented.

Further, the radiographic intensifying screen of the present invention is remarkably improved in the afterglow characteristics by the provision of the phosphor layer containing a divalent europium activated barium fluorohalide phosphor onto the phosphor layer containing a terbium activated rare earth oxysulfide phosphor.

Furthermore, the radiographic intensifying screen of the present invention is prominently enhanced in the graininess as compared with the conventional radiographic intensifying screen employing a terbium activated rare earth oxysulfide phosphor alone.

As described hereinbefore, the divalent europium activated barium fluorohalide phosphor emits blue light. On the other hand, the terbium activated rare earth oxysulfide phosphor emits mainly blue light in the case that the rare earth element (host component of the phosphor) is yttrium, while emits mainly green light in the case that the rare earth element is lanthanum, gadolinium or lutetium. Moreover, the terbium activated rare earth oxysulfide phosphor varies its light emission region depending upon the amount of terbium activator, that is, the emission in green region is more emphasized as the amount of terbium activator is increased. Accordingly, the light emitted from the radiographic intensifying screen of the present invention can be optionally changed from the blue to green light, by varying the kind or ratio of the rare earth elements or the amount of terbium activator of the terbium activated rare earth oxysufide phosphor employed therein, otherwise, by varying the ratio between the amount of the terbium activated rare earth oxyfulfide phosphor and the amount of the divalent europium activated barium fluorohalide phosphor contained therein. In other words, a radiographic film employed together with the radiographic intensifying screen of the present invention can be one sensitive to blue light (namely, regular-type radiographic film) or one sensitive to green light (namely, ortho-type radiographic film). Thus, the radiographic intensifying screen of the present invention can sensityze either of the regular-type and ortho-type radiographic films.

The radiographic intensifying screen of the present invention which comprises the first phosphor layer containing at least one terbium activated rare earth oxysulfide phosphor formed on the support and the second phosphor layer containing at least one divalent europium activated barium fluorohalide phosphor provided on the first phosphor layer, is prominently improved in the antistatic characteristics, the afterglow characteristics and the graininess, as compared with the conventional radiographic intensifying screen having a single phosphor layer containing the terbium activated rare earth oxysulfide phosphor.

The radiographic intensifying screen of the present invention having the preferable characteristics as described above can be prepared, for instance, in the following manner.

The support material employed in the present invention can be selected from those employed in the conventional radiogaphic intensifying screens. Examples of the support material include plastic films such as films of cellulose acetate, polyester, polyethylene terephthalate, polyamide, polyimide, triacetae and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material. The plastic film may contain a light-absorbing material such as carbon black, or may contain a light-reflecting material such as titanium dioxide. The former is appropriate for preparing a high-sharpness type radiographic intensifying screen, while the latter is appropriate for preparing a high-speed type radiographic intensifying screen.

In the conventional radiographic intensifying screen, one or more additional layers are occasionally provided between the support and the phosphor layer, so as to enhance the adhesion between the support and the phosphor layer, or to improve the radiographic speed of the intensifying screen or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In radiographic intensifying screens employed in the industrial radiography for nondestructive inspection, a metal foil is optionaly provided on the phosphor layer side surface of the support, so as to remove a scattered radiation. Such a metal foil is chosen from lead foil, lead alloy foil, tin foil and the like. In the present invention, one or more of these additional layers may be provided depending on the type of the intensifying screen to be obtained.

The phosphor layer side surface of the support (or the surface of an adhesive layer, light-reflecting layer, light-absorbing layer or a metal foil in the case where such layers provided on the phosphor layer) may be provided with protruded and depressed portions for enhancement of the sharpness of radiographic image, as described in Janpnese Patent Application No. 57(1982)-64674 by the present applicant.

On the support prepared as described above, phosphor layers are formed. The phosphor layer comprises a binder and phosphor particles dispersed therein. In the present invention, as described hereinbefore, the phosphor layer comprises the first phosphor layer and the second phosphor layer.

The first phosphor layer is provided on the support side and contains at least one terbium activated rare earth oxysulfide phosphor. The second phosphor layer is provided on the first phosphor layer, that is, on the protective film side and contains at least one divalent europium activated fluorohalide phosphor.

The provision of the second phosphor layer containing a divalent europium barium fluorohalide phosphor on the protective film side brings about highly antistatic chracteristics to the resulting radiographic intensifying screen. It is presumed that the highly antistatic characteristics of the intensifying screen has relation to relatively high aqueous solubility of the divalent europium activated barium fluorohalide phosphor, but the exact reason is not clear.

Further, the above-mentioned divalent europium activated barium fluorohalide phosphor shows emission of high luminance when excited with a radiation such as X-rays, and the afterglow characteristics of the phosphor is satisfactory. Accordingly, the phosphor can give the improvement in the above-described characteristics without lowering the other characteristics of the resulting radiographic intensifying screen.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The first phosphor layer can be formed on the support, for instance, by the following procedure.

In the first place, terbium activated rare earth oxysulfide phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the amount of the binder and the amount of the phosphor in the coating dispersion may be determined according to the characteristics of the aimed radiographic intensifying screen and the nature of the phosphor employed. Generally, the ratio therebetween is within the range of from 1:1 to 1:100 (binder:-phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a first phosphor layer. The thickness of the first phosphor layer varies depending upon the characteristics of the aimed radiographic intensifying screen, the nature of the phosphor, the ratio between the binder and the phosphor, etc. Generally, the thickness of the first phosphor layer is within a range of from 20 $\mu$m to 1 mm, preferably from 20 to 200 $\mu$m.

The first phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

On thus formed phosphor layer containing a terbium activated rare earth oxysulfide phosphor (first phosphor layer), another phosphor layer containing a divalent europium activated barium fluorohalide phosphor (second phosphor layer) is formed in the same manner as described above.

The binder, solvent for the coating dispersion and optional additives such as a dispersing agent and plasticizer which are employable for the formation of the second phosphr layer can be optionaly chosen from those described hereinbefore for the formation of the first phosphor layer.

When the second phosphor layer is formed directly on the first phosphor layer through the coating procedure, the binder and solvent for the second phosphor layer are preferably chosen from ones different from those of the first phosphor layer so as not to dissolve the surface of the first phosphor layer which has been already formed.

The ratio of the amount of the phosphor between the first phosphor layer and the second phosphor layer is preferably within the range of 5:1 to 1:1, by weight. The thickness of the first phosphor layer is preferably larger than that of the second phosphor layer.

In the present invention, the protective film is provided on the second phosphor layer. The protective film is desired to be a transparent film.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 3 to 20 $\mu$m.

For further enhancement in the antistatic characteristics of the radiographic intensifying screen, ordinarily employable antistatic agents may be incorporated into the coating dispersion, or a solution of the antistatic agent in an appropriate solvent may be coated over the surface of the protective film upon formed.

The following examples will further describe the present invention, but these examples are by no means intended to restrict the invention.

EXAMPLE 1

To a mixture of a particulated terbium activated gadolinium oxysulfide phosphor ($Gd_2O_2S$:Tb) and polyurethane (20:1, by weight) were added toluene and ethanol to prepare a dispersion containing the phosphor particles. Tricresyl phosphate was added to the dispersion and the mixture was then stirred sufficiently by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 $\mu$m) placed horizontally on a glass plate. The coating procedure was carried out using a doctor blade. After the coating was complete, the support having the coating dispersion was placed in an oven and heated at a temperature gradually rising from 25° to 100° C. Thus, a phosphor layer having the thickness of approximately 90 $\mu$m (first phosphor layer) was formed on the support.

Independently, to a mixture of a particulated divalent europium activated barium fluorbromide phosphor ($BaFBr:Eu^{2+}$) and a linear polyester resin were added successively methyl ethyl ketone and nitrocellulose (nitrification degree: 11.5%), to prepare a dispersion containing the phosphor particles and the binder in the ratio of 20:1 (phosphor : binder, by weight). To the dispersion were added tricresyl phosphate, n-butanol and methyl ethyl ketone. The mixture was sufficiently stirred by means of a propeller agitater to obtain a homogeneous coating dispersion having a viscosity of 25–35 PS (at 25° C.).

Thus obtained coating dispersion was applied over the previously formed first phosphor layer in the same manner as described above. Thus, a phosphor layer having the thickness of approximately 40 μm (second phosphor layer) was formed on the first phosphor layer.

On the second phosphor layer was placed a transparent polyethylene terephthalate film (thickness: 12 μm; provided with a polyester adhesive layer) to combine the transparent film and the second phosphor layer through the adhesive layer.

Thus, a radiographic intensifying screen consisting essentially of a support, the first phosphor layer, the second phosphor layer and a transparent protective film was prepared.

EXAMPLE 2

The procedure of Example 1 was repeated except that the first phosphor layer and the second phosphor layer were prepared to have thickness of 140 μm and 70 μm, respectively, to obtain a radiographic intensifying screen consisting essentially of a support, the first phosphor layer, the second phosphor layer and a transparent protective film.

EXAMPLE 3

The procedure of Example 1 was repeated except that the first phosphor layer and the second phosphor layer were prepared to have thickness of 100 μm and 90 μm, respectively, to obtain a radiographic intensifying screen consisting essentially of a support, the first phosphor layer, the second phosphor layer and a transparent protective film.

COMPARISON EXAMPLE 1

To a mixture of a particulated terbium activated gadolinium oxysulfide phosphor ($Gd_2O_2S:Tb$) and a linear polyester resin were added successively methyl ethyl ketone and nitrocellulose (nitrification degree: 11.5%), to prepare a dispersion containing the phosphor particles and the binder in the ratio of 20:1 (phosphor:binder, by weight). To the dispersion were added tricresyl phosphate, n-butanol and methyl ethyl ketone. The mixture was sufficiently stirred by means of a propelled agitater to obtain a homogeneous coating dispersion having viscosity of 25–35 PS (at 25° C.).

The coating dispersion was applied to a polyethylene terephthalate sheet containing titanium dioxide (support same as employed in Example 1) in the same manner as described in Example 1, to form a phosphor layer having the thickness of 140 μm on the support.

Thereafter, the procedure described in Example 1 was applied to prepare a radiographic intensifying screen consisting essentially of a support, a phosphor layer and a transparent protective film.

The radiographic intensifying screens prepared in the manner as described above were evaluated on the antistatic characteristics, the afterglow characteristics and the graininess of image. Their measurements were done as follows:

(1) Antistatic characteristics

An X-ray film was allowed to stand at a temperature of 25° C. and at a relative humidity of 25% for 1 hour.

An electron charge measuring device for a radiographic intensifying screen equipped with two drums rotatable in directions adverse to each other and in substantial contact with each other and an electron charge measuring gauge (Faraday gauge) was employed.

Over the each surface of the two drums, a radiographic intensifying screen was wound in such a manner that the protective film faced outside.

After the above-mentioned X-ray film was passed through between the two drums at the site where the surfaces of the two drums were kept in contact with each other, the amount of electron charge accumulated on the intensifying screen was measured by means of the Faraday gauge. The X-ray film was then developed to observe the appearence of static mark through eye measurement. The results were marked by five levels of A through E; in which Level A means that no static mark was observed, and Level B means a small number of the static marks causing no problem in pracitical use were observed. Levels C to E all mean that relatively great numbers of the static marks were observed, in which the numbers of the static marks increased in this order.

(2) Afterglow characteristics

The emission luminance of a radiographic intensifying screen was measured with the passage of time by means of a photomultiplier, after exposure to X-rays at a voltage of 50 KVp and at a current of 10 mA for 5 min. The results are expressed in the ratio of the emission luminance after lapse of 30 sec. from exposure to X-rays in relation to the initial emission luminance.

(3) Graininess of image

An ortho-type X-ray film was combined with a radiographic intensifying screen in a cassette and the radiographic procedure was carried out. The X-ray film was then developed to obtain a visible image, and the visible image was observed through eye measurement on the graininess of image. The results were marked by five levels of A through E, in which Level A means that the graininess was particularly excellent, and B means that the graininess is satisfactory in pracitical use. Levels C and E all mean that the graininess was not satisfactory, in which the graininess lowered in this order.

The results on the evaluation of the radiographic intensifying screens are set forth in Table 1. The sharpness of image (MTF value at the spatial frequency of 2 cycle/mm) and the relative radiographic speed for the radiographic intensifying screens are also set forth in Table 1.

TABLE 1

| | Ex. 1 | Ex. 2 | Ex. 3 | Com. Ex. 1 |
|---|---|---|---|---|
| Thickness (μm) | | | | |
| 2nd Phosphor Layer | 40 | 70 | 90 | — |
| 1st Phosphor Layer | 90 | 140 | 100 | 140 |
| Antistatic Characteristics | B | B | A | E |
| Afterglow Characteristics | $2 \times 10^{-4}$ | $8 \times 10^{-5}$ | $5 \times 10^{-5}$ | $1 \times 10^{-3}$ |
| Graininess | B | A | A | E |

TABLE 1-continued

| | Ex. 1 | Ex. 2 | Ex. 3 | Com. Ex. 1 |
|---|---|---|---|---|
| Sharpness | 0.23 | 0.22 | 0.24 | 0.23 |
| Relative Radio-graphic Speed | 700 | 860 | 770 | 830 |

I claim:

1. A radiographic intensifying screen comprising a support, phosphor layers provided thereon which comprise a binder and phosphor particles dispersed therein, and a protective film provided on said phosphor layers, in which said phosphor layers comprise:

(i) a first phosphor layer provided on said support comprising terbium activated rare earth oxysulfide phosphor; and (ii) a second phosphor layer provided on the first phosphor layer comprising divalent europium activated barium fluorohalide phosphor, a ratio between the phosphor of the first layer and the phosphor of the second layer being within the range of 5:1 to 1:1, by weight.

2. The radiographic intensifying screen as claimed in claim 1, in which each of said first phosphor layer and said second phosphor layer has a thickness within the range of 20–200 μm.

3. The radiographic intensifying screen as claimed in claim 1 or claim 2, in which the protective film is made of a polyethylene terephthalate film.

4. The radiographic intensifying screen as claimed in claim 1, wherein the thickness of the first phosphor layer is larger than that of the second phosphor layer.

* * * * *